United States Patent
Guo et al.

(10) Patent No.: US 10,547,836 B2
(45) Date of Patent: Jan. 28, 2020

(54) MOST PROBABLE TRANSFORM FOR INTRA PREDICTION CODING

(71) Applicant: QUALCOMM Incorporated, San Diego, CA (US)

(72) Inventors: Liwei Guo, San Diego, CA (US); Marta Karczewicz, San Diego, CA (US); Xianglin Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/622,878

(22) Filed: Jun. 14, 2017

(65) Prior Publication Data

US 2017/0289543 A1    Oct. 5, 2017

Related U.S. Application Data

(63) Continuation of application No. 13/648,121, filed on Oct. 9, 2012, now Pat. No. 9,699,457.
(Continued)

(51) Int. Cl.
    *H04N 19/11*        (2014.01)
    *H04N 19/122*       (2014.01)
    (Continued)

(52) U.S. Cl.
    CPC .......... *H04N 19/11* (2014.11); *H04N 19/122* (2014.11); *H04N 19/147* (2014.11);
    (Continued)

(58) Field of Classification Search
    CPC ....... H04N 19/00278; H04N 19/00781; H04N 19/00545; H04N 19/00084; H04N 19/00042; H04N 19/00884; H04N 19/00072; H04N 19/00121; H04N 19/00969; H04N 19/00024; H04N 19/00175; H04N 19/00551;
    (Continued)

(56) References Cited

U.S. PATENT DOCUMENTS 8,292,455 B2    10/2012  Koizumi
8,804,816 B2     8/2014  Li et al.
(Continued)

FOREIGN PATENT DOCUMENTS

CN    101415121 A    4/2009
EP      2373034 A1   10/2011
WO   2010067668 A1    6/2010

OTHER PUBLICATIONS

Yuan et al. "Non-Square Quadtree Transform for symmetric and asymmetric motion partition", Torino, IT, Jul. 14-22, 2011.*
(Continued)

*Primary Examiner* — Anand S Rao
*Assistant Examiner* — Samuel D Fereja
(74) *Attorney, Agent, or Firm* — Qualcomm Incorporated

(57) ABSTRACT

A video coder can be configured to determine an intra-prediction mode for a block of video data, identify a most probable transform based on the intra-prediction mode determined for the block of video data, and code an indication of whether the most probable transform is a transform used to encode the block of video data. The most probable transform can be a non-square transform.

11 Claims, 9 Drawing Sheets

Related U.S. Application Data

(60) Provisional application No. 61/545,901, filed on Oct. 11, 2011.

(51) Int. Cl.
  *H04N 19/147* (2014.01)
  *H04N 19/176* (2014.01)
  *H04N 19/46* (2014.01)
  *H04N 19/61* (2014.01)

(52) U.S. Cl.
  CPC ........... *H04N 19/176* (2014.11); *H04N 19/46* (2014.11); *H04N 19/61* (2014.11)

(58) Field of Classification Search
  CPC ....... H04N 19/00763; H04N 19/00109; H04N 19/00218; H04N 19/00296; H04N 19/00569; H04N 7/26101; H04N 19/00139; H04N 19/00212; H04N 19/00521; H04N 7/26074; H04N 7/26106; H04N 7/50; H04N 19/00369; H04N 19/00793; H04N 7/26244; H04N 7/26313; H04N 7/3022; H04N 19/001
  See application file for complete search history.

(56) References Cited

U.S. PATENT DOCUMENTS

| | | | |
|---|---|---|---|
| 9,661,338 | B2 | 5/2017 | Karczewicz et al. |
| 9,699,457 | B2 | 7/2017 | Guo et al. |
| 2005/0157797 | A1 | 7/2005 | Gaedke |
| 2008/0181304 | A1 | 7/2008 | Sekiguchi et al. |
| 2010/0086049 | A1 | 4/2010 | Ye et al. |
| 2010/0195715 | A1 | 8/2010 | Liu et al. |
| 2011/0038412 | A1 | 2/2011 | Jung et al. |
| 2011/0135000 | A1 | 6/2011 | Alshina et al. |
| 2011/0243225 | A1 | 10/2011 | Min et al. |
| 2011/0255591 | A1 | 10/2011 | Kim et al. |
| 2011/0310973 | A1 | 12/2011 | Cheon et al. |
| 2012/0082222 | A1 | 4/2012 | Wang et al. |
| 2012/0106633 | A1 | 5/2012 | Kim et al. |
| 2012/0163470 | A1 | 6/2012 | Wu et al. |
| 2012/0170649 | A1 | 7/2012 | Chen et al. |
| 2012/0230411 | A1 | 9/2012 | Liu et al. |
| 2012/0281928 | A1 | 11/2012 | Cohen et al. |
| 2013/0051452 | A1 | 2/2013 | Li et al. |

OTHER PUBLICATIONS

Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.

Bross B., et al., "High Efficiency Video Coding (HEVC) text specification draft 8", 10. JCT-VC Meeting; 101. MPEG Meeting; Nov. 7, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J1003_d7, Jul. 23, 2012 (Jul. 23, 2012), XP030112947, 260 Pages.

Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.

Bross, et al., "WD5: Working Draft 5 of High-Efficiency Video Coding," JCTV-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Cao X., et al., "CE6.b1 Report on Short Distance Intra Prediction Method", Mar. 10, 2011, No. JCTVC-E278, 5th Meeting, Geneva, Mar. 16-23, 2011, XP030008784, ISSN: 0000-0007.

Cao X., et al.,"CE6.c Report on Simplification of Short Distance Intra Prediction (SDIP) Method", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-TSG. 16) ; URL: http://wftp3.itu.int/av-arch/jctvc-site/,, No. JCTVC-G556, Nov. 8, 2011 (Nov. 8, 2011), XP030110540.

Chuang T.D., et al.,"Luma Intra Prediction Mode Coding", 6. JCT-VC Meeting; 97. Mpeg Meeting; Jul. 14, 2011-Jul. 22, 2011; Torino;(Joint Collaborative Team on Video Coding of ISO/ IEC JTC1/SC29/WG11 and ITU-T SG. 16) ; URL: http://wftp3.itu.int/av-arch/jctvc-site/,, No. JCTVC-F062, Jul. 15, 2011 (Jul. 15, 2011), XP030009085.

Cohen R.A., et al., "Direction-Adaptive Transforms for Coding Prediction Residuals", International Conference on Image Processing (ICIP 2010), USA, Sep. 26, 2010 (Sep. 26, 2010), pp. 185-188, XP031812635, ISBN: 978-1-4244-7992-4.

Guo L., et al.,"Non-Square Transform for 2NxN and Nx2N Motion Partitions" , 6. JCT-VC Meeting; 97. MPEG Meeting; Jul. 14, 2011-Jul. 22, 2011; TORINO; (Joint Collaborative Team on Video Coding of ISO/ IEC JTC1/SC29/WG11 and ITU-T SG. 16) ; URL: http://wftp3.itu.int/av-arch/jctvc-site/,, No. JCTVC-F563, Jul. 16, 2011 (Jul. 16, 2011), 9 Pages, XP030009586.

International Preliminary Report on Patentability—PCT/US2012/059574, The International Bureau of WIPO—Geneva, Switzerland, dated Jan. 23, 2014.

International Search Report and Written Opinion—PCT/US2012/059574—ISA/EPO—dated Dec. 5, 2012.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Panusoponc K., et al., "Efficient Transform Unit Representation," Joint Collaborative Team on Video Coding of ITU-T SG16 WP3 and ISO/IEC JTC1/SC29/WG11, 4th Meeting, Jan. 20-28, 2011, 3 pages.

Richardson I E G: "H264/MPEG-4 Part 10 White Paper—Prediction of Intra Macroblocks" Internet Citation, [Online] XP02281494, Apr. 2003, Retrieved from the Internet: URL: http://www.vcodex.com/h264.html.h264_intrapred.pdf [retrieved on May 24, 2004].

Sarwer, Mohammed Golam, "Efficient Motion Estimation and Mode Decision Algorithms for Advanced Video Coding," A Dissertation Submitted to the Faculty of Graduate Studies through the Department of Electrical and Computer Engineering in Partial Fulfillment of the Requirements for the Degree of Doctor of Philosophy at the University of Windsor, 2011.

Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 pp.

Wiegand, T., et al., "WD3: Working Draft 3 of High-Efficiency Video Coding," Document JCTVC-E603, 5th Meeting: Geneva, CH, Mar. 16-23, 2011, 193 pages.

Wiegand T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.

Wien M., "Variable Block-Size Transforms for H.264/AVC," IEEE Transactions on Circuits and Systems for Video Technology, vol. 13, No. 7, Jul. 2003, pp. 604-613, XP011099253, ISSN: 1051-8215, DOI: 10.1109/TCSVT.2003.815380.

Zhang et al., "Enhanced Intra Prediction and Transform for Video Coding", 2010 17th IEEE International Conference on Image Pro-

(56) References Cited

OTHER PUBLICATIONS cessing (ICIP 2010), Hong Kong, Sep. 26-29, 2010, IEEE, Sep. 26, 2010 (Sep. 26, 2010), pp. 3381-3384, XP031814166, ISBN: 978-1-4244-7992-4.
Prosecution History from U.S. Appl. No. 13/648,121, dated from Aug. 21, 2014 through Apr. 27, 2017, 145 pp.
Marpe et al., "Context-Based Adaptive Binary Arithmetic Coding in the H.264/AVC Video Compression Standard," IEEE Trans. on Circuits and Systems for Video Technology, vol. 13(7) (2003), Jul. 1, 2003.
CE7: Tool 1—Mode dependent intra residual coding for 8x8 blocks, Jul. 14, 2011.
ITU-T H.264 (Mar. 2010) "Advanced video coding for generic audiovisual services", Mar. 1, 2010.

\* cited by examiner

MOST PROBABLE TRANSFORM FOR INTRA PREDICTION CODING

This application is a continuation of U.S. patent application Ser. No. 13/648,121, filed 9 Oct. 2012, which claims the benefit of U.S. Provisional Application 61/545,901 filed 11 Oct. 2011, the entire content of which is incorporated herein by reference.

TECHNICAL FIELD

This disclosure relates to video coding, and more particularly, to signaling of coding characteristics for coded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into video blocks. Each video block can be further partitioned. Video blocks in an intra-coded (I) frame or slice are encoded using spatial prediction with respect to neighboring video blocks. Video blocks in an inter-coded (P or B) frame or slice may use spatial prediction with respect to neighboring macroblocks or coding units in the same frame or slice or temporal prediction with respect to other reference frames.

SUMMARY

This disclosure describes techniques for signaling a selected transform size for a block of video data in an encoded video bitstream. According to the techniques of this disclosure, a most probable transform can be determined based on an intra prediction mode for the block. The most probable transform may be either a square transform or a non-square transform. A first syntax element can signal if the determined most probable transform is the actual transform size used to code the transform block. If the actual transform is the most probable transform, then no other syntax elements need to be signaled in the encoded bitstream. If the actual transform is not the most probable transform, then an additional syntax element can signal which transform (other than the most probable transform) is the actual transform used for coding the block.

In one example, a method of coding video data includes determining an intra-prediction mode for a block of video data; identifying a most probable transform based on the intra-prediction mode determined for the block of video data, wherein the most probable transform is a non-square transform; and, coding an indication of whether the most probable transform is a transform used to encode the block of video data.

In another example, a video coding device includes a video coder configured to determine an intra-prediction mode for a block of video data, identify a most probable transform based on the intra-prediction mode determined for the block of video data, wherein the most probable transform is a non-square transform; and, code an indication of whether the most probable transform is a transform used to encode the block of video data.

In another example, a device for video coding includes means for determining an intra-prediction mode for a block of video data; means for identifying a most probable transform based on the intra-prediction mode determined for the block of video data, wherein the most probable transform is a non-square transform; and, means for coding an indication of whether the most probable transform is a transform used to encode the block of video data.

In another example, a computer-readable storage medium stores instructions operable to cause one or more processors to determine an intra-prediction mode for a block of video data; identify a most probable transform based on the intra-prediction mode determined for the block of video data, wherein the most probable transform is a non-square transform; and, code an indication of whether the most probable transform is a transform used to encode the block of video data.

The details of one or more examples are set forth in the accompanying drawings and the description below. Other features, objects, and advantages will be apparent from the description and drawings, and from the claims.

DETAILED DESCRIPTION

Figure 1:
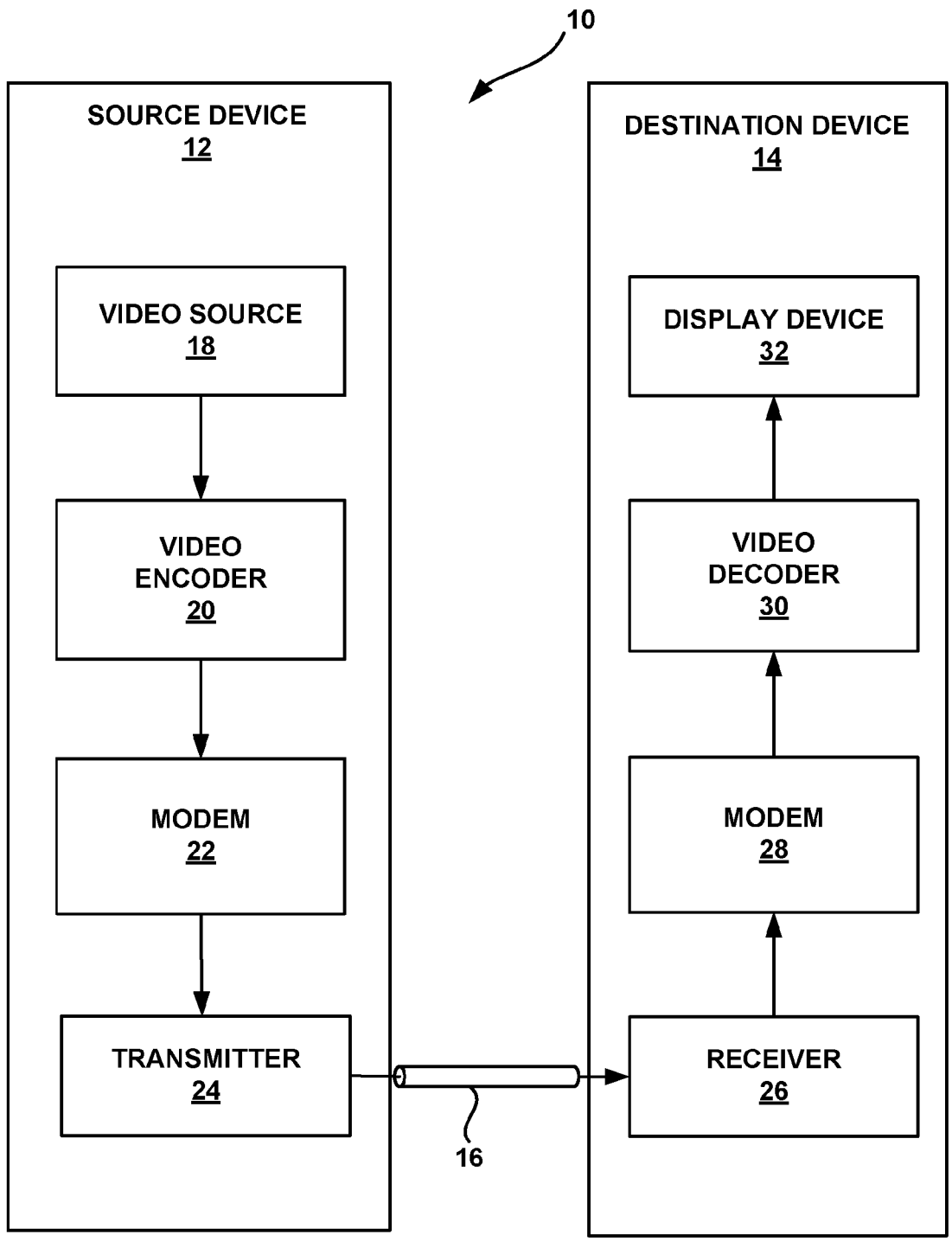
FIG. 1 is a block diagram illustrating an example video encoding and decoding system that may utilize techniques described in this disclosure.

Video coders compress video data by taking advantage of spatial and temporal redundancy. For example, a video coder may take advantage of spatial redundancy by predicting a current block relative to previously coded neighboring blocks of the same picture. Predicting a current block relative to a previously coded neighboring block of the same picture is sometimes referred to as intra prediction or intra mode. Likewise, a video coder may take advantage of temporal redundancy by predicting a current block relative to data of previously coded pictures. Predicting a current block relative to a block of a previously coded frame is sometimes referred to as inter prediction or inter mode. In both intra prediction and inter prediction, the video coder predicts a current block from an already coded block, and then calculates residual data for the block as a difference between the actual values for the block and the predicted values for the block.

As will be explained in greater detail below, a set of residual values may be transformed, scanned, and quantized to define a set of transform coefficients. The data structure that includes the transform coefficients is typically referred to as a transform unit (TU). TUs of various shapes and sizes can be used for transmitting and reconstructing encoded video data. This disclosure describes techniques for signaling in an encoded bitstream, the size of a TU to be used for a particular block of video data. More particularly, this disclosure describes techniques for exploiting a correlation between intra prediction modes and transform sizes that may reduce the bit overhead associated with signaling a transform size.

As will be explained in greater detail below, the newly emerging HEVC standard allows a quadtree style TU partition structure for video blocks. Using quadtree decomposition, a large square block can be split into four smaller square blocks. Each of the four smaller square blocks may also each be split into four block that are smaller yet, and so on until a smallest block size is reached. With level-1 decomposition, the whole transform block is split into four quarter-sized blocks. At level-2, one or more of the four quarter-sized transform block are further split into four 1/16 sized transform blocks. At level-3, one or more of the 1/16 sized transform blocks are further split into four even smaller transform blocks. Whether a transform block needs to be further split or not can be determined, for example, based on rate-distortion optimization calculations determined as part of encoding the video data. A TU at level-0 means that the whole coding unit is transformed together without further splitting. In such a case, the TU has the same size as the coding unit.

Using non-square transforms for intra predicted blocks has been proposed. In such instances, a TU can have a rectangular shape. Assume 2N×2N denotes a square transform. Non-square transforms can thus be represented as hN×2N and 2N×hN, where hN represents half the value of N, and 2N represents twice the value of N. Therefore, a 2N×2N TU can be split into four vertical transforms (i.e. four hN×2N transforms) or four horizontal transforms (i.e. four 2N×hN transforms). In one example of a current technique, a video encoder can first signal in an encoded bitstream, a flag (NS_Flag) to signal to a video decoder whether square transforms (i.e. N×N) are used or not, with for example, the NS_Flag set to 0 signaling that transform N×N is selected and the NS_Flag set to 1 signaling that one of the two non-square transforms (hN×2N and 2N×hN) are selected. In the case where one of the two non-square transforms is selected (i.e. NS_Flag=1), an additional flag (NS_Dir) may need to be transmitted, with for example, NS_Dir set to 0 indicating that transform size hN×2N is selected and NS_Dir set to 1 indicating that transform size 2N×hN is selected.

According to the signaling method described above, one flag is used when an N×N transform is selected while two flags are used when non-square transforms hN×2N or 2N×hN are selected. This signaling technique may produce a bit savings when N×N is the most probable transform due to the fewest signaling bits (1 flag in this example) being used for the N×N transform. However, in some instances, the most likely transform may be a non-square transform as opposed to the N×N transform. For example, whether the most likely transform for a particular block of video data is a square transform or a non-square transform may depend on the intra prediction mode used to code the block. According to techniques of this disclosure, when the most probable transform size for a block is a non-square transform, a video encoder may signal in an encoded bitstream a flag indicating if the most probable transform is the actual transform used to code the block. Accordingly, when a non-square transform is the most probable transform, a bit savings may be achieved by using one flag for signaling the non-square transform as opposed to the two flags described above. Accordingly, the techniques of this disclosure may in some instances improve the transform signaling method by using the fewest signaling bits for the most probable transform.

In one example, a video encoder can first select an intra-prediction mode for a coding unit, and then select a transform as described above. Each intra-prediction mode k can have an associated most probable transform (MPT), which can, for example, be one of N×N, hN×2N or 2N×hN. The video encoder can generate a flag (MPT_Flag) for inclusion in the encoded bitstream to signal if the selected transform is MPT(k) for the current intra-prediction mode k. For example, MPT_Flag set to 1 can mean the selected transform is MPT (k), while MPT_Flag set to 0 can mean the selected transform is not MPT (k). In instances where MPT_Flag is set to 0, an extra flag (MPT_ResMode) can be transmitted to signal which of the other two transforms is selected.

As an example, suppose the intra-prediction mode for a current prediction block is mode 1, and hN×2N is the MPT associated with this intra-prediction mode, i.e. hN×2N=MPT(1). If the selected intra-prediction mode is hN×2N, then MPT_Flag set to 1 can be signaled in an encoded bitstream without any other additional bits needed to signal the transform. If the selected intra-prediction mode is N×N, then MPT_Flag set to 0 can be signaled, followed by MPT_ResMode set to 0. If the selected intra-prediction mode is 2N×hN, then MPT_Flag set to 0 can be signaled, followed by MPT_ResMode set to 1.

In some instances, the most probable transforms for the intra-prediction modes, MPT(k), can be pre-defined and known to both a video encoder and a video decoder. In other instances, the most probable transforms for the intra-prediction modes, MPT(k), can be determined by a video encoder and signaled in an encoded bitstream using a high-level syntax such as a sequence parameter set (SPS), picture parameter set (PPS), adaptation parameter set (APS), etc. In yet other instances, the mapping between MPT and intra-prediction mode k, MPT(k), can be block-size adaptive, where for different block sizes, MPT(k) can be different even when the intra-prediction mode is the same. Similarly, MPT(k) may also be adaptive based on other information, such as QP, inter-prediction direction, block type, etc.

In some instances, the most probable transform for the intra-prediction modes, MPT(k), can be based on the selected transform of a number of already encoded blocks. For example, if for all the blocks with the same intra-prediction mode k which are already encoded in the current frame, transform N×N is the most frequently occurring transform, MPT(k) can be set to be N×N transform for the encoding of the current block. In such an example, the frequency with such transforms occur can be tracked by both a video encoder and a video decoder, such that the mapping of most probable transforms to intra-prediction modes can be dynamically adjusted at both the video encoder and the video decoder without the mapping being explicitly signaled in the encoded bitstream.

FIG. 1 is a block diagram illustrating an example video encoding and decoding system 10 that may utilize techniques for signaling transform sizes, as described in this disclosure. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless.

The techniques of this disclosure, however, which concern coding of syntax data representative of a transform size for blocks of video data, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data. Moreover, communication channel 16 is intended to represent just one of many ways in which a video encoding device might transmit data to a video decoding device. For example, in other configurations of system 10, source device 12 might generate encoded video for decoding by destination device 14 and store the encoded video on a storage medium or a file server, such that the encoded video may be accessed by destination device 14 as desired.

In the example of FIG. 1, source device 12 includes a video source 18, a video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for coding syntax data representative of intra-prediction modes for blocks of video data. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. The techniques for coding syntax data representative of a selected transform for a block of video data may be performed by any digital video encoding and/or decoding device. Although generally the techniques of this disclosure are performed by a video coding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to coding syntax data representative of intra-prediction modes for blocks of video data. The information communicated over channel 16 may include syntax information defined by video encoder 20, which is also used by video decoder 30, that includes syntax elements that describe characteristics and/or processing of macroblocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a macroblock or a partition of a macroblock. The video blocks may have fixed or varying sizes, and may differ in size according to a specified coding standard. Each video frame may include a plurality of slices. Each slice may include a plurality of macroblocks, which may be arranged into partitions, also referred to as sub-blocks.

As an example, the ITU-T H.264 standard supports intra-prediction in various block sizes, such as 16×16, 8×8, or 4×4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N. Block sizes that are less than 16×16 may be referred to as partitions of a 16×16 macroblock in ITU-T H.264.

Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units.

New video coding standards are being developed, such as the High Efficiency Video Coding (HEVC) standard. The emerging HEVC standard may also be referred to as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction modes, HM provides as many as thirty-three intra-prediction modes, e.g., based on the size of a block being intra-prediction coded. A recent draft of the HEVC standard, referred to as "HEVC Working Draft 8" or "WD8," is described in document JCTVC-J1003, Bross et al., "High efficiency video coding (HEVC) text specification draft 8," Joint Collaborative Team on Video Coding (JCT-VC) of ITU-T SG16 WP3 and ISO/IEC JTC1/SC29/WG11, 10th Meeting: Stockholm, SE 11-20 Jul. 2012, which, as of 3 Oct. 2012, is downloadable from http://phenix.int-evry.fr/jct/doc_end_user/documents/10_Stockholm/wg11/JCTVC-J1003-v8.zip.

HM refers to a block of video data as a coding unit (CU). Syntax data within a bitstream may define a largest coding unit (LCU), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, a prediction unit (PU), or a TU.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-prediction mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more TUs. Following prediction using a PU, a video encoder may calculate a residual value for the portion of the CU corresponding to the PU. A set of residual values may be transformed, scanned, and quantized to define a set of transform coefficients. The TU defines a data structure that includes the transform coefficients. A TU is not necessarily limited to the size or shape of a PU. Thus, TUs may be larger or smaller than corresponding PUs for the same CU, and TUs may be either square or non-square. In some examples, the maximum size of a TU may correspond to the size of the corresponding CU.

Figure 2A:
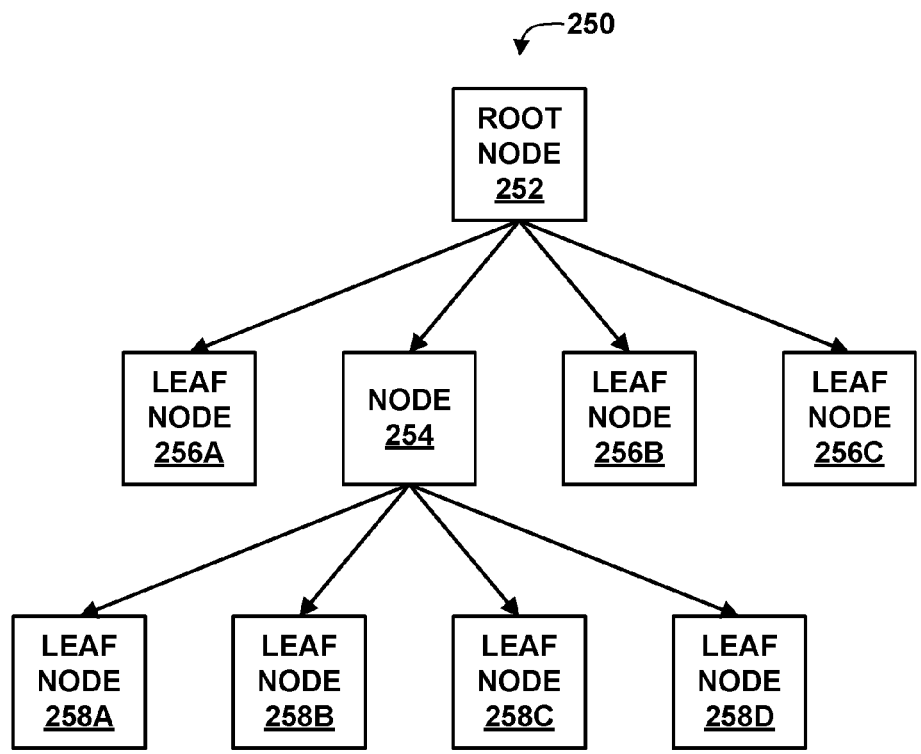
FIGS. 2A and 2B are conceptual diagrams illustrating an example of quadtree partitioning applied to a largest coding unit (LCU).
Figure 2B:
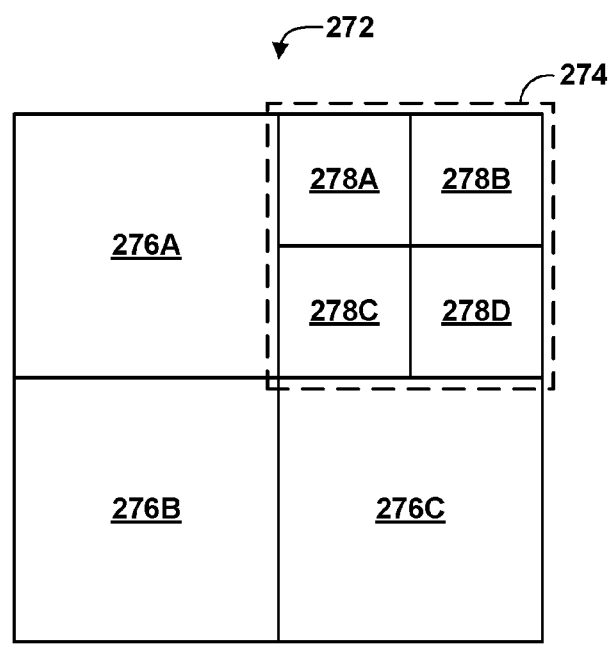

FIGS. 2A and 2B are conceptual diagrams illustrating an example quadtree 250 and a corresponding LCU 272. FIG. 2A depicts an example quadtree 250, which includes nodes arranged in a hierarchical fashion. Each node in a quadtree, such as quadtree 250, may be a leaf node with no children, or have four child nodes. In the example of FIG. 2A, quadtree 250 includes root node 252. Root node 252 has four child nodes, including leaf nodes 256A-256C (leaf nodes 256) and node 254. Because node 254 is not a leaf node, node 254 includes four child nodes, which in this example, are leaf nodes 258A-258D (leaf nodes 258).

Quadtree 250 may include data describing characteristics of a corresponding LCU, such as LCU 272 in this example. For example, quadtree 250, by its structure, may describe splitting of the LCU into sub-CUs. Assume that LCU 272 has a size of 2N×2N. LCU 272, in this example, has four sub-CUs 276A-276C (sub-CUs 276) and 274, each of size N×N. Sub-CU 274 is further split into four sub-CUs 278A-278D (sub-CUs 278), each of size N/2×N/2. The structure of quadtree 250 corresponds to the splitting of LCU 272, in this example. That is, root node 252 corresponds to LCU 272, leaf nodes 256 correspond to sub-CUs 276, node 254 corresponds to sub-CU 274, and leaf nodes 258 correspond to sub-CUs 278.

Data for nodes of quadtree 250 may describe whether the CU corresponding to the node is split. If the CU is split, four additional nodes may be present in quadtree 250. In some examples, a node of a quadtree may be implemented similar to the following pseudocode:

```
quadtree_node {
    boolean split_flag(1);
    // signaling data
    if (split_flag) {
        quadtree_node child1;
        quadtree_node child2;
        quadtree_node child3;
        quadtree_node child4;
    }
}
```

The split_flag value may be a one-bit value representative of whether the CU corresponding to the current node is split. If the CU is not split, the split_flag value may be '0', while if the CU is split, the split_flag value may be '1'. With respect to the example of quadtree 250, an array of split flag values may be 101000000.

In some examples, each of sub-CUs 276 and sub-CUs 278 may be intra-prediction encoded using the same intra-prediction mode. Accordingly, video encoder 122 may provide an indication of the intra-prediction mode in root node 252. Moreover, certain sizes of sub-CUs may have multiple possible transforms for a particular intra-prediction mode. Video encoder 122 may provide an indication of the transform to use for such sub-CUs in root node 252. For example, sub-CUs of size N/2×N/2 may have multiple possible transforms available. Video encoder 122 may signal the transform to use in root node 252. Accordingly, video decoder 128 may determine the transform to apply to sub-CUs 278 based on the intra-prediction mode signaled in root node 252 and the transform signaled in root node 252.

As such, video encoder 122 need not signal transforms to apply to sub-CUs 276 and sub-CUs 278 in leaf nodes 256 and leaf nodes 258, but may instead simply signal an intra-prediction mode and, in some examples, a transform to apply to certain sizes of sub-CUs, in root node 252, in accordance with the techniques of this disclosure. In this manner, these techniques may reduce the overhead cost of signaling transform functions for each sub-CU of an LCU, such as LCU 272.

In some examples, intra-prediction modes for sub-CUs 276 and/or sub-CUs 278 may be different than intra-prediction modes for LCU 272. Video encoder 122 and video decoder 130 may be configured with functions that map an intra-prediction mode signaled at root node 252 to an available intra-prediction mode for sub-CUs 276 and/or sub-CUs 278. The function may provide a many-to-one mapping of intra-prediction modes available for LCU 272 to intra-prediction modes for sub-CUs 276 and/or sub-CUs 278.

Figure 3:
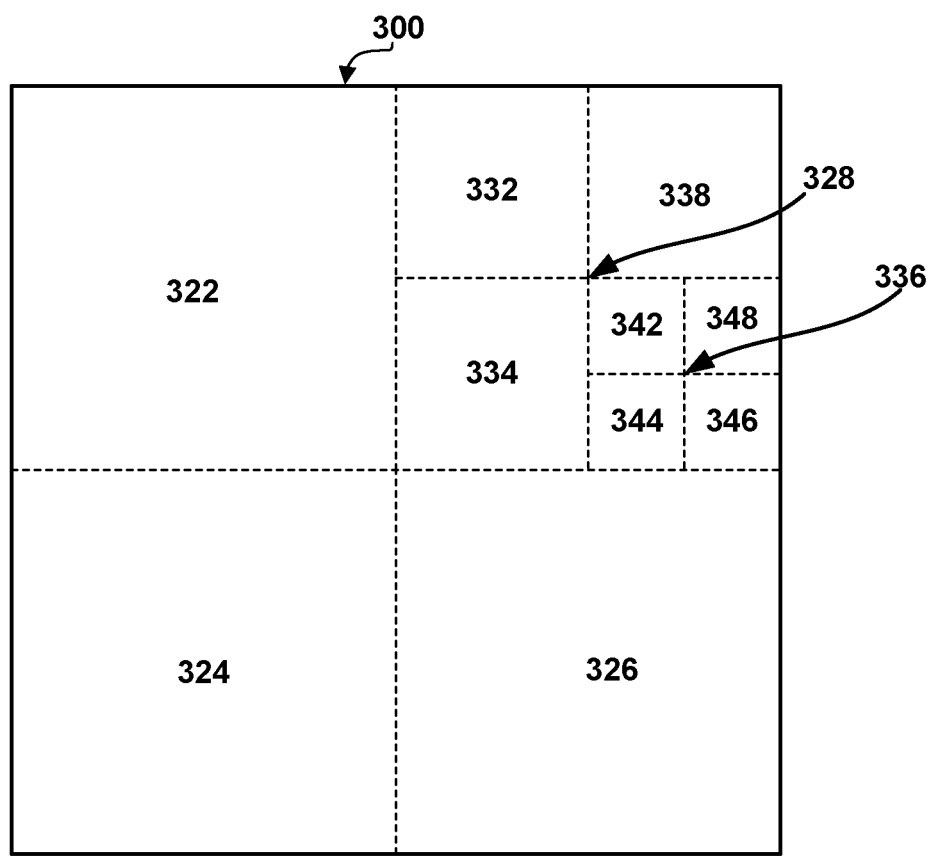
FIG. 3 is a conceptual diagram illustrating an example of quadtree partitioning.

FIG. 3 shows an example of a quadtree style TU partition structure, as introduced above. The newly emerging HEVC standard allows a quadtree style TU partition structure. As shown in FIG. 3, for example, the whole block 300 with solid lines represents the original coding unit. The dotted lines indicate one example outcome of transform block decomposition according to a quad-tree structure. Of course, such an outcome is just one out of many possible decompositions. In the example of FIG. 3, there are three levels of transform decompositions. With level-1 decomposition, the whole transform block is split into four quarter-sized blocks (blocks 322, 324, 326, and 328 in FIG. 3). At level-2, the second quarter-sized transform block is further split into four 1/16 sized transform blocks (blocks 332, 334, 336, and 338 in FIG. 3). At level-3, the fourth 1/16 sized transform block (block 336) is further split into four even smaller transform blocks (blocks 342, 344, 346, and 348). Whether a transform block needs to be further split or not can be determined, for example, based on rate-distortion optimization. The example shown in FIG. 3 is called quad-tree decomposition structure, in which case a block is either not split or split into four quarter-sized blocks. A TU at level-0 means that the whole coding unit is transformed together without further splitting. In such a case, the TU has the same size as the coding unit.

Figure 4A:
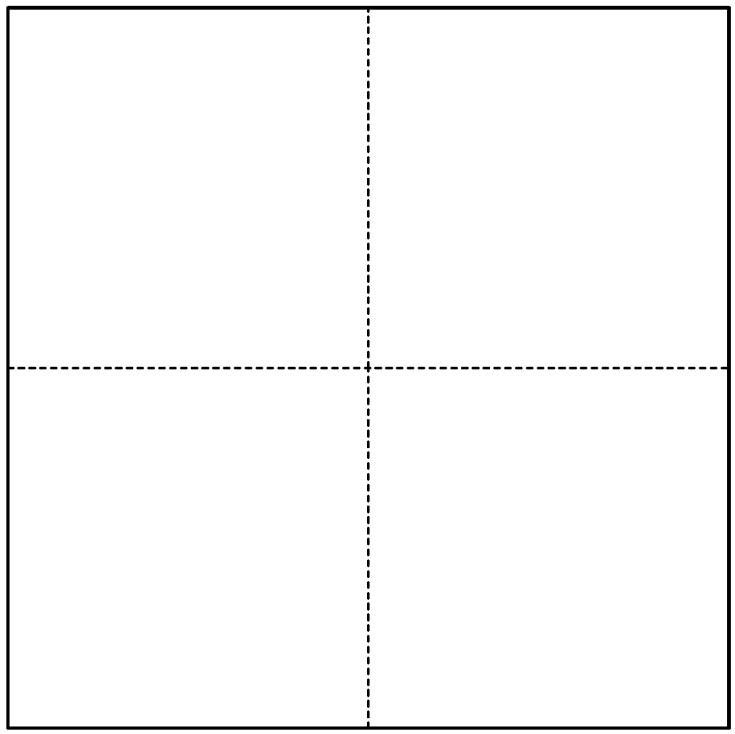
FIGS. 4A and 4B are conceptual diagrams of square transform unit partitions.
Figure 4B:
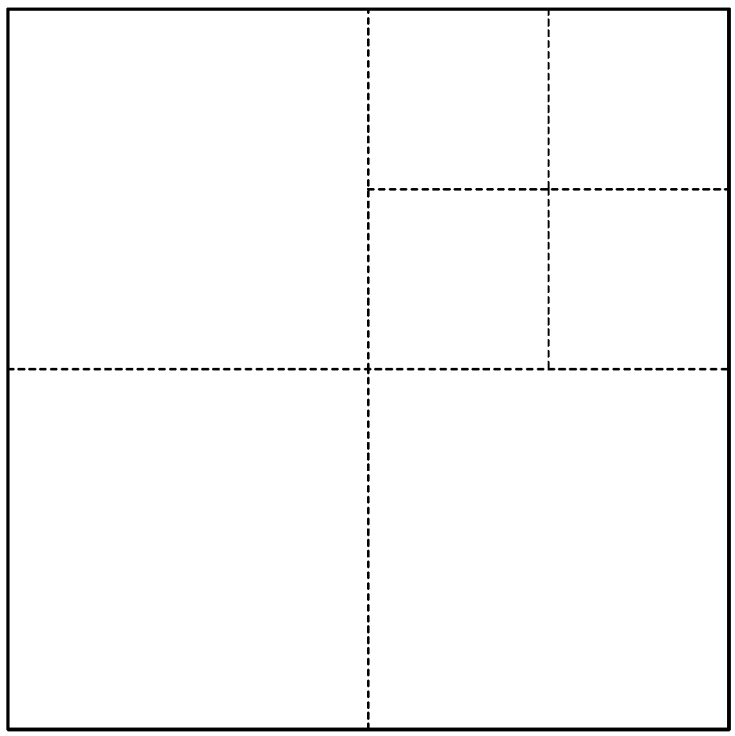

For an intra-predicted block, according to some coding methods, only square shape TUs (such as the TUs shown in FIG. 3) are allowed. In addition, according to some coding methods, the TUs are always aligned with prediction units for an intra-predicted block. Examples are shown in FIGS. 4A and 4B. In the example of FIG. 4A, a block is partitioned into four quarter-sized blocks. In the example of FIG. 4B, the second quarter-sized block is further partitioned into four smaller blocks with a size of 1/16 original block size. Based on current implementations of HEVC, each block shown in FIGS. 6A and 6B can be predicted, transformed and reconstructed separately. The transform block (or TU) size may be the same as the prediction block (or prediction unit) size.

Figure 5A:
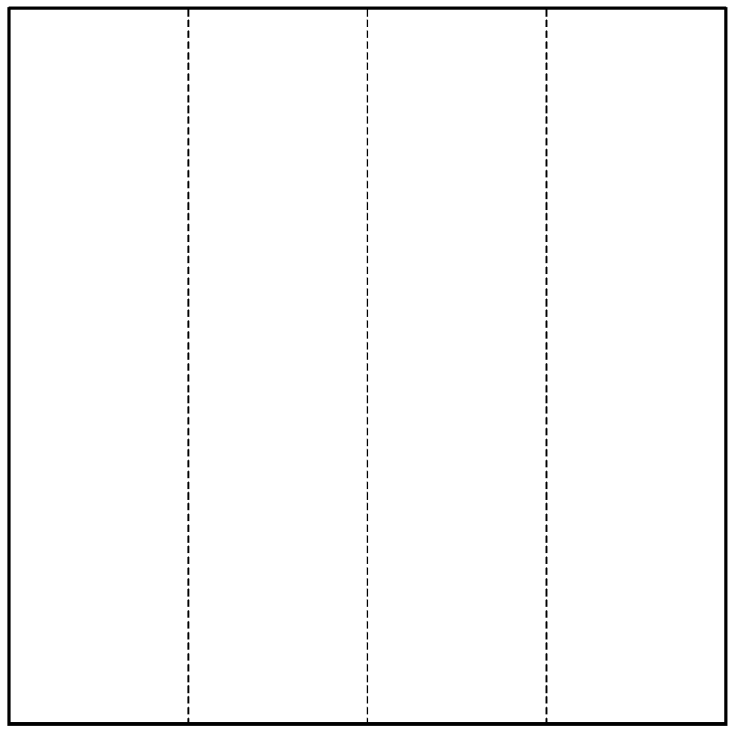
FIGS. 5A and 5B are conceptual diagrams of non-square transform unit partitions.
Figure 5B:
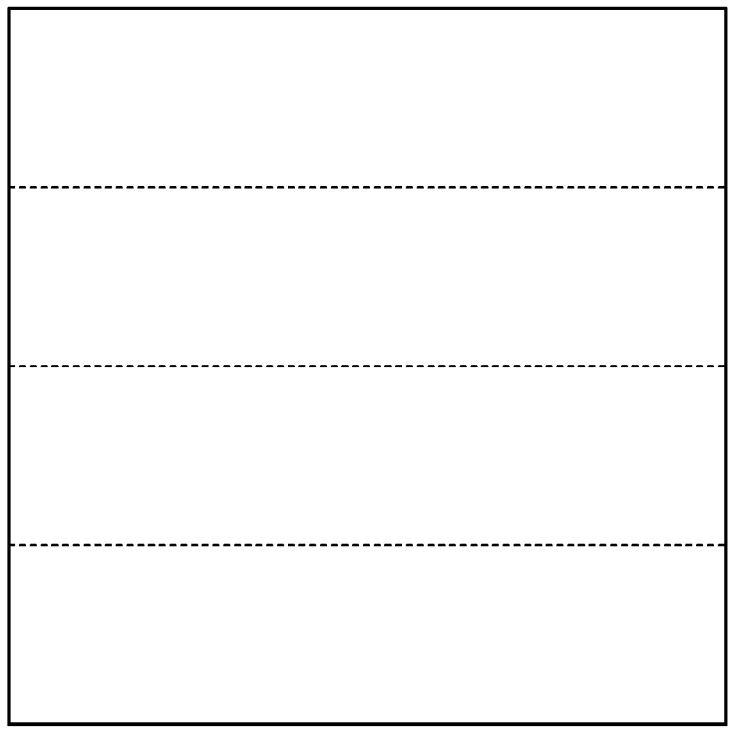

FIGS. 5A and 5B show examples of non-square transforms, which may be used for intra predicted blocks. In such instances, a TU can have rectangular shape. The examples of FIGS. 5A and 5B can be enabled in additional to the square shape transforms discussed above. In other words, for given a block, the examples shown in both FIGS. 4A and 4B and FIGS. 5A and 5B can be used. For example, at decomposition level-1, a block may choose a transform partition shown in FIG. 4A. The block may also choose a transform partition shown in FIG. 5A and FIG. 5B. At video encoder 20, all of these three different prediction and TU partitions can be tested, with the selected partition unit and TU being signaled to video decoder 30.

Assume N×N denotes the transform4 shown in FIG. 4A, hN×2N denotes the transform shown in FIG. 5A, and 2N×hN denotes the transform shown in FIG. 5B. In one example, video encoder 20 can first signal a flag (NS_Flag) to signal to video decoder 30 whether square transform N×N is used or not, with NS_Flag set to 0 signaling transform N×N is selected and NS_Flag set to 1 signaling one of the two non-square transforms (hN×2N and 2N×hN) is selected. In the case where one of the two non-square transforms is selected (i.e. NS_Flag=1), an additional flag (NS_Dir) may need to be signaled, with NS_Dir set to 0 indicating transform hN×2N is selected and NS_Dir set to 1 indicating 2N×hN is selected. Enabling non-square shape transforms in addition to square shape transforms in this manner may improve coding efficiency.

According to the signaling method described above, one flag is used when an N×N transform is selected while two flags are used when non-square transforms hN×2N or 2N×hN are selected. This may produce a bit savings when N×N is the most probable transform in intra prediction coding because the fewest signaling bits (1 flag in this example) is used for the most frequently occurring transform mode. However, in some instances, the most probable transform for different intra-prediction directions (e.g. the 35 intra-prediction direction modes shown in FIG. 4) may be different. According to techniques of this disclosure, when a non-square transform is the most probable mode, a bit savings may be achieved by using one flag for signaling the non-square transform as opposed to the two flags described above. Accordingly, the techniques of this disclosure may in some instances improve the transform signaling method by using the fewest signaling bits for the most probable transform.

In accordance with the techniques of this disclosure, video encoder 20 may encode certain blocks of video data using intra-prediction mode encoding, and provide information indicating a selected intra-prediction mode used to encode the block. Video encoder 20 may intra-prediction encode blocks of any type of frame or slice using an intra-prediction mode, e.g., I-frames or I-slices, in addition to P-frames or P-slices and B-frames or B-slices. When video encoder 20 determines that a block should be intra-prediction mode encoded, video encoder 20 may perform a rate-distortion analysis to select a most appropriate intra-prediction mode. For example, video encoder 20 may calculate rate-distortion values for one or more intra-prediction modes, and select one of the modes having acceptable rate-distortion characteristics.

Video encoder 20 may also be configured to determine an encoding context for the block. The context may include various characteristics of the block such as, for example, a size of the block, which may be determined in terms of pixel dimensions, prediction unit (PU) type such as, in the example of HEVC, 2N×2N, N×2N, 2N×N, N×N, short-distance intra-prediction (SDIP) types such as 2N×N/2, N/2×2N, 2N×1, 1×2N, a macroblock type in the example of H.264, a coding unit (CU) depth for the block, or other measurements of size for a block of video data. In some examples, the context may correspond to how any or all of intra-prediction modes for an above-neighboring block, a left-neighboring block, an above-left neighboring block, an above-right neighboring block, or other neighboring blocks. In some examples, the context may include both intra-prediction modes for one or more blocks as well as size information for the current block being encoded. Other contexts may also be defined or used for a block based on data from neighboring blocks or other data that can provide contextual information about the block.

In any case, video encoder 20 may include configuration data that maps the context for the block to various coding characteristics for the current block. For example, based on the context for the block, the configuration data may indicate one or more most probable intra-prediction modes. Video encoder 20 may, in some examples, be configured to begin analysis for selection of an intra-prediction mode with the most probable mode, based on the context. When the most probable mode achieves suitable rate-distortion characteristics, in some examples, video encoder 20 may select the most probable mode. In other examples, video encoder 20 need not begin the selection process with the most probable mode.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

Video decoder 30 may ultimately receive encoded video data, e.g., from modem 28 and receiver 26. In accordance with the techniques of this disclosure, video decoder 30 may receive encoded data representative of an intra-prediction mode used to encode a block of video data. Video decoder 30 may be configured to determine a coding context for the block in a manner substantially similar to video encoder 20. Moreover, video decoder 30 may include similar configuration data to video encoder 20, e.g., indications of a most probable mode, an intra-prediction mode index table, and a VLC table for each coding context, etc.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 6:
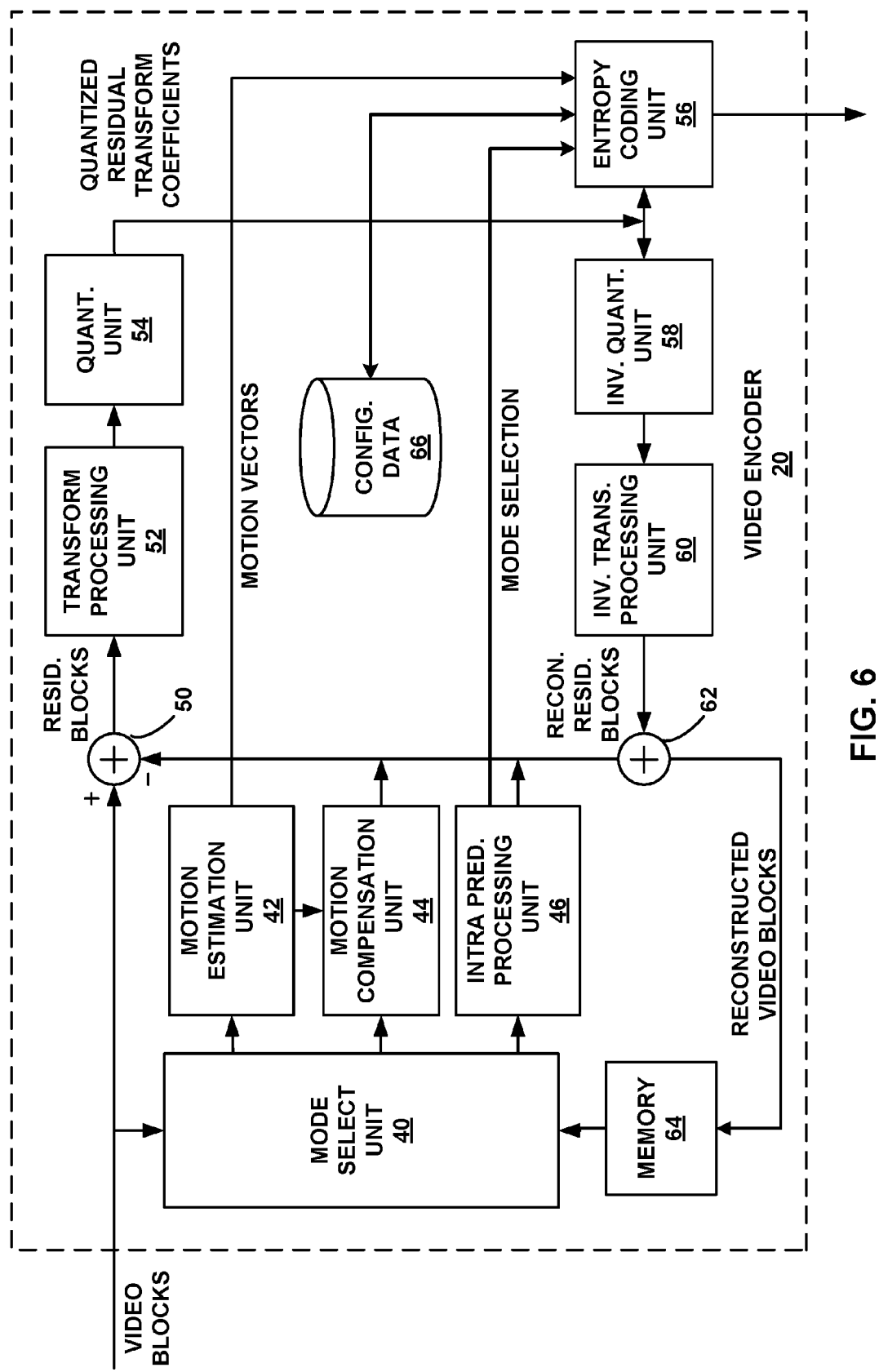
FIG. 6 is a block diagram illustrating an example of a video encoder that may implement techniques described in this disclosure.

FIG. 6 is a block diagram illustrating an example of video encoder 20 that may implement techniques for coding information indicative of a transform for a particular CU. Video encoder 20 may perform intra- and inter-coding of blocks within video frames, including macroblocks, or partitions or sub-partitions of macroblocks. Intra-coding relies on spatial prediction to reduce or remove spatial redundancy in video within a given video frame. Inter-coding relies on temporal prediction to reduce or remove temporal redundancy in video within adjacent frames of a video sequence. Intra-prediction mode (I-mode) may refer to any of several spatial based compression modes and inter-modes such as uni-directional prediction (P-mode) or bi-directional prediction (B-mode) may refer to any of several temporal-based compression modes.

As shown in FIG. 6, video encoder 20 receives a current video block within a video frame to be encoded. In the example of FIG. 6, video encoder 20 includes mode select unit 40, motion compensation unit 44, motion estimation unit 42, intra-prediction processing unit 46, memory 64, summer 50, transform processing unit 52, quantization unit 54, and entropy coding unit 56. For video block reconstruction, video encoder 20 also includes inverse quantization unit 58, inverse transform processing unit 60, and summer 62. Various loop filters (not shown in FIG. 6) such as a deblocking filter, sample adaptive offset filter, and/or adaptive loop filter may also be included to filter the reconstructed video blocks. If desired, the loop filters would typically filter the output of summer 62.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra-prediction processing unit 46 may perform intra-predictive coding of the received video block relative to one or more neighboring blocks in the same frame or slice as the block to be coded to provide spatial compression.

Mode select unit 40 may select one of the coding modes (e.g. intra or inter) based on error results and based on a frame or slice type for the frame or slice including a current block being coded, and provides the resulting intra- or inter-coded block to summer 50 to generate residual block data and to summer 62 to reconstruct the encoded block for use in a reference frame or reference slice. In general, intra-prediction involves predicting a current block relative to neighboring, previously coded blocks, while inter-prediction involves motion estimation and motion compensation to temporally predict the current block.

Motion estimation unit 42 and motion compensation unit 44 represent the inter-prediction elements of video encoder 20. Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in reference frame store 64. Motion compensation unit 44 may also interpolate sub-integer pixels of the reference frame, e.g., an I-frame or a P-frame. The ITU H.264 standard, as an example, describes two lists: list 0, which includes reference frames having a display order earlier than a current frame being encoded, and list 1, which includes reference frames having a display order later than the current frame being encoded. Therefore, data stored in reference frame store 64 may be organized according to these lists.

Motion estimation unit 42 compares blocks of one or more reference frames from reference frame store 64 to a block to be encoded of a current frame, e.g., a P-frame or a B-frame. When the reference frames in reference frame store 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in reference frame store 64 if no values for sub-integer pixel positions are stored in reference frame store 64. Motion estimation unit 42 sends the calculated motion vector to entropy coding unit 56 and motion compensation unit 44. The reference frame block identified by a motion vector may be referred to as a predictive block. Motion compensation unit 44 may calculate prediction data based on the inter-predictive block.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

Figure 7:
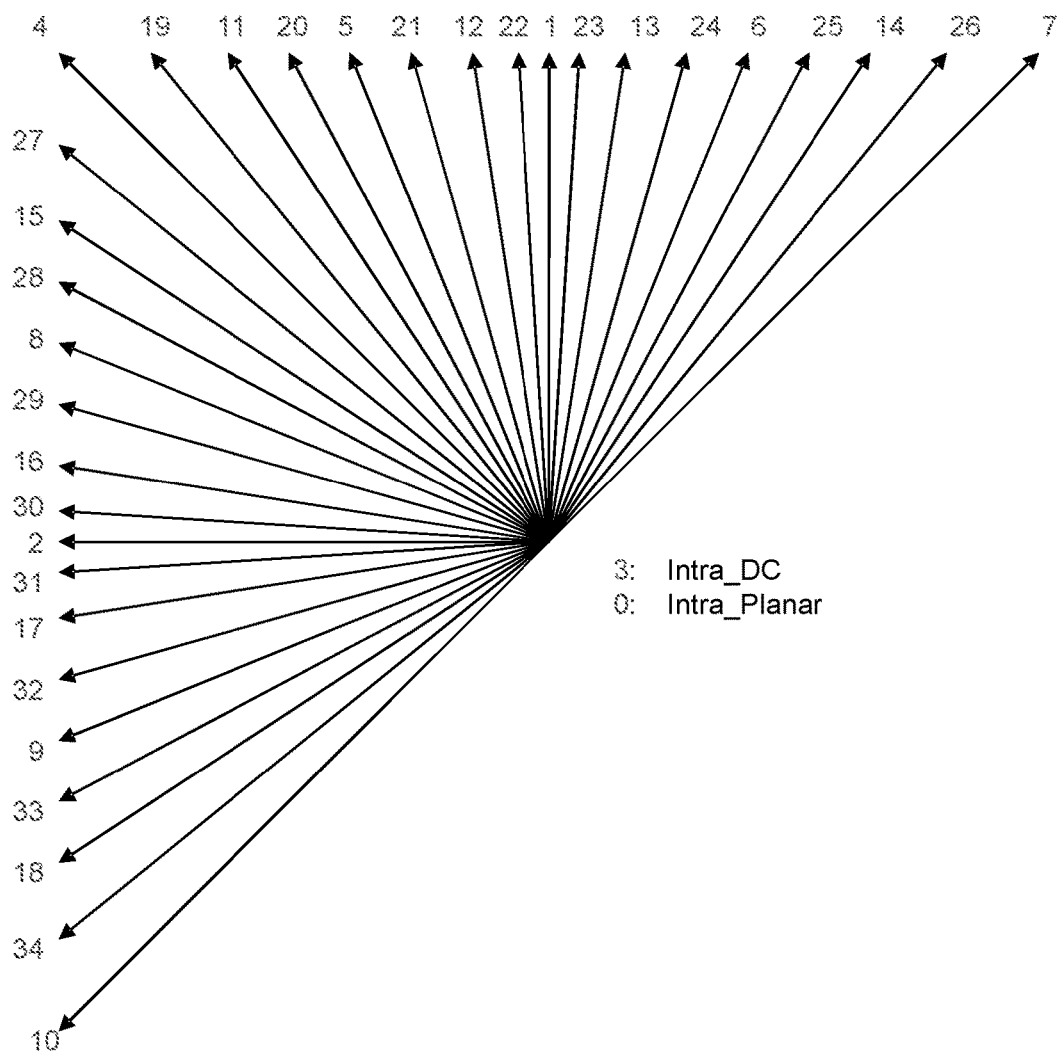
FIG. 7 shows an example of intra-prediction modes and directions.

FIG. 7 shows an example of intra-prediction modes and corresponding mode indexes that may be used with HEVC. The arrows of FIG. 7 represent a prediction direction, the numbers represent a mode index. Table 1 below provides a correspondence between a CU size and a number of intra-prediction modes available to encode CUs of that size in one intermediate version of HEVC specification. As can be seen by Table 1, 8×8, 16×16, and 32×32 CUs may use the 35 intra-prediction modes shown in FIG. 4, while 4×4 and 64×64 CUs use a smaller set of intra-prediction modes.

TABLE 1

| Coding Unit Size | Number of Intra-Prediction Modes |
|---|---|
| 4 × 4 | 18 |
| 8 × 8 | 35 |
| 16 × 16 | 35 |
| 32 × 32 | 35 |
| 64 × 64 | 4 |

HEVC currently allows 35 different intra-prediction modes. These modes include one DC mode, one planar mode, and 33 different directional prediction modes. With a directional prediction mode, prediction is performed based on neighboring block reconstructed pixels along a certain direction indicated by the mode. The directions associated with different prediction modes are shown in FIG. 7.

In any case, after selecting an intra-prediction mode for a block, intra-prediction processing unit 46 may provide information indicative of the selected intra-prediction mode for the block to entropy coding unit 56. Entropy coding unit 56 may encode the information indicating the selected intra-prediction mode in accordance with the techniques of this disclosure.

After predicting a current block, e.g., using intra-prediction or inter-prediction, video encoder 20 may form a residual video block by subtracting the prediction data calculated by motion compensation unit 44 or intra-prediction processing unit 46 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms, such as those defined by the H.264 standard, which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

In one example, after selecting an intra-prediction mode (e.g. one of 35 shown in FIG. 6) for each prediction unit, video encoder 20 can then select a transform as described above. Each intra-prediction mode k can have an associated most probable transform MPT (k), which is one of N×N, hN×2N or 2N×hN, for example. Video encoder 20 can generate a flag (MPT_Flag) for inclusion in the encoded bitstream to signal if the selected transform is MPT(k) for the current intra-prediction mode k. For example, MPT_Flag set to 1 can indicate the selected transform is MPT (k), while MPT_Flag set to 0 can indicate the selected transform is not MPT (k). In instances where MPT_Flag is set to 0, an extra flag (MPT_ResMode) can be generated to signal which of the other two transforms is selected.

As an example, suppose the intra-prediction mode for a current PU is mode 1, and hN×2N is the MPT associated with this intra-prediction mode, i.e. hN×2N=MPT(1). If the selected intra-prediction mode is hN×2N, then MPT_Flag set to 1 can be signaled in an encoded bitstream from video encoder 20 to video encoder 30 with no other bits needed for signaling the transform. If the selected intra-prediction mode is N×N, then MPT_Flag set to 0 can be signaled, followed by MPT_ResMode set to 0. If the selected intra-prediction mode is 2N×hN, then MPT_Flag set to 0 can be signaled, followed by MPT_ResMode set to 1.

In some instances, the most probable transforms for the intra-prediction modes, MPT(k), can be pre-defined and known to both video encoder 20 and video decoder 30. In other instances, the most probable transforms for the intra-prediction modes, MPT(k), can be determined by video encoder 20 and signaled to video decoder 30 using a high-level syntax such as an (sequence parameter set), PPS (picture parameter set), APS (adaptation parameter set), etc. In yet other instances, the mapping between MPT and intra-prediction mode k, MPT(k), can be block-size adaptive, where for different block sizes, MPT(k) can be different even when the intra-prediction mode is the same. Similarly, MPT(k) may also be adaptive based on other information, such as QP, inter-prediction direction, block type, etc.

In some instances, the most probable transform for the intra-prediction modes, MPT(k), can be based on the selected transform of a number of already encoded blocks. For example, if for all the blocks with the same intra-prediction mode k which are already encoded in the current frame, transform N×N is the most frequently occurring transform, MPT(k) can be set to be N×N transform for the encoding of the current block. In such an example, the frequency with such transforms occur can be tracked by both video encoder 20 and video decoder 30, such that the mapping of most probable transforms to intra-prediction modes can be dynamically adjusted at both video encoder 20 and video decoder 30 without the mapping being explicitly signaled between video encoder 20 and video decoder 30.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring blocks and/or block sizes.

In some cases, entropy coding unit 56 or another unit of video encoder 20 may be configured to perform other coding functions, in addition to entropy coding and coding of the intra-prediction mode as described above. For example, entropy coding unit 56 may be configured to determine coded block pattern (CBP) values for the blocks and partitions. Also, in some cases, entropy coding unit 56 may perform run length coding of the coefficients in a macroblock or partition thereof. In particular, entropy coding unit 56 may apply a zig-zag scan or other scan pattern to scan the transform coefficients in a macroblock or partition and encode runs of zeros for further compression. Entropy coding unit 56 also may construct header information with appropriate syntax elements for transmission in the encoded video bitstream.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame store 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame store 64. The reconstructed video block may be used by motion estimation unit 42 and motion compensation unit 44 as a reference block to inter-code a block in a subsequent video frame.

In this manner, video encoder 20 represents an example of a video encoder that can be configured to determine an intra-prediction mode for a block of video data, identify a most probable transform based on the intra-prediction mode determined for the block of video data, and code an indication of whether the most probable transform is a transform used to encode the block of video data. The most probable transform can be a non-square transform. Video encoder 20 can code the indication of whether the most probable transform is the transform used to encode the block of video data by generating a flag indicating whether the most probable transform is the transform used to encode the block of video data. In response to the most probable transform not being the transform used to encode the block of video data, video encoder 20 can generate an indication of a transform other than the most probable transform, where the transform other than the most probable transform is the transform used to encode the block of video data. The transforms can be selected from a group of transforms consisting of N×N, hN×2N, and 2N×hN, where N represents a size of a dimension of a transform, hN represents half the value of N, and 2N represents twice the value of N.

Video encoder 30 may also maintain a mapping of most probable transforms to intra-prediction modes. The mapping can be fixed, signaled from video encoder 20 to a video decoder, or can be adaptive. If the mapping is adaptive, the mapping may, for example, be adaptive based on block size. The mapping can be based on a frequency of how often transforms have been selected for previously encoded video blocks with a particular intra-prediction mode.

Figure 8:
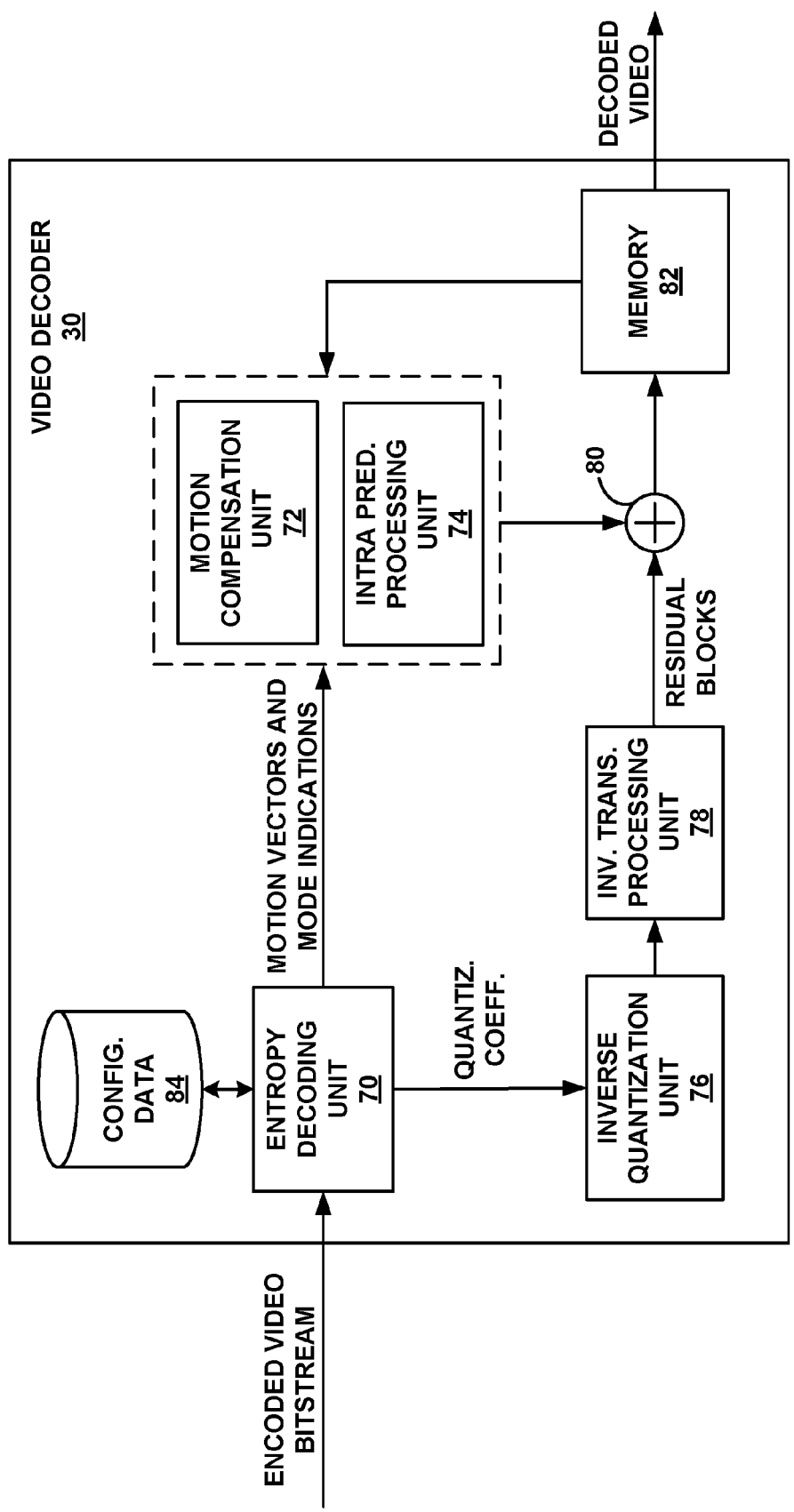
FIG. 8 is a block diagram illustrating an example of a video decoder, which decodes an encoded video sequence.

FIG. 8 is a block diagram illustrating an example of video decoder 30, which decodes an encoded video sequence. In the example of FIG. 5, video decoder 30 includes an entropy decoding unit 70, motion compensation unit 72, intra-prediction processing unit 74, inverse quantization unit 76, inverse transformation processing unit 78, memory 82 and summer 80. Video decoder 30 may, in some examples, perform a decoding pass generally reciprocal to the encoding pass described with respect to video encoder 20 (FIG. 6). Motion compensation unit 72 may generate prediction data based on motion vectors received from entropy decoding unit 70.

Motion compensation unit 72 may use motion vectors received in the bitstream to identify a prediction block in reference frames in reference frame store 82. Intra-prediction processing unit 74 may use intra-prediction modes received in the bitstream to form a prediction block from spatially adjacent blocks. In particular, video decoder 30, in the example of FIG. 5, includes configuration data 84. Configuration data 84 is substantially similar to configuration data 66 of FIG. 6, in that configuration data 84 includes information describing contexts for intra-predicted blocks, most probable intra-prediction mode for each context, etc.

Entropy decoding unit 70 may receive data representative of an intra-prediction mode to use to decode an encoded block of video data. Entropy decoding unit 70 may determine a context for the encoded block, e.g., based on intra-prediction modes for a left-neighboring and top-neighboring block to the encoded block and/or a size for the encoded block. Based on the context, entropy decoding unit 70 may determine one or more most probable intra-prediction modes to use to decode the block.

Intra-prediction processing unit 74 may use the indication of the intra-prediction mode to intra-predict the encoded block, e.g., using pixels of neighboring, previously decoded blocks. For examples in which the block is inter-prediction mode encoded, motion compensation unit 72 may receive information defining a motion vector, in order to retrieve motion compensated prediction data for the encoded block. In any case, motion compensation unit 72 or intra-prediction processing unit 74 may provide information defining a prediction block to summer 80.

Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard or as performed by the HEVC Test Model. The inverse quantization process may also include use of a quantization parameter $QP_Y$ calculated by encoder 20 for each macroblock to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of blocks used to encode frame(s) of the encoded video sequence, partition information that describes how each block of a frame or slice of the encoded video sequence is partitioned, modes indicating how each partition is encoded, one or more reference frames (and reference frame lists) for each inter-encoded block or partition, and other information to decode the encoded video sequence.

In one example, after determining an intra-prediction mode (e.g. one of 35 shown in FIG. 6) for each prediction unit, video decoder 30 can then determine a transform size used for a TU associated with the PU. Each intra-prediction mode k can have an associated most probable transform MPT (k), which is one of N×N, hN×2N or 2N×hN, for example. Video decoder 30 can receive a flag (MPT_Flag) in the encoded bitstream to signal if the selected transform is MPT(k) for the current intra-prediction mode k. For example, MPT_Flag set to 1 can indicate the selected transform is MPT (k), while MPT_Flag set to 0 can indicate the selected transform is not MPT (k). In instances where MPT_Flag is set to 0, an extra flag (MPT_ResMode) can be received to signal which of the other two transforms is selected.

As an example, suppose the intra-prediction mode for a current PU is mode 1, and hN×2N is the MPT associated with this intra-prediction mode, i.e. hN×2N=MPT(1). If the selected intra-prediction mode is hN×2N, then MPT_Flag set to 1 can be received by video decoder 30 in an encoded bitstream. If the selected intra-prediction mode is N×N, then MPT_Flag set to 0 can be received by video decoder 30 in an encoded bitstream, followed by MPT_ResMode set to 0. If the selected intra-prediction mode is 2N×hN, then MPT_Flag set to 0 can be received, followed by MPT_ResMode set to 1.

In some instances, the most probable transforms for the intra-prediction modes, MPT(k), can be pre-defined and known to both video encoder 20 and video decoder 30. In other instances, the most probable transforms for the intra-prediction modes, MPT(k), can be determined by video encoder 20 and signaled to video decoder 30 using a high-level syntax such as an element within an SPS (sequence parameter set), a PPS (picture parameter set), a APS (adaptation parameter set), a slice header, a block header, or another type of syntax. In yet other instances, the mapping between MPT and intra-prediction mode k, MPT(k), can be block-size adaptive, where for different block sizes, MPT(k) can be different even when the intra-prediction mode is the same. Similarly, MPT(k) may also be adaptive based on other information, such as QP, inter-prediction direction, block type, etc.

In some instances, the most probable transform for the intra-prediction modes, MPT(k), can be based on the selected transform of a number of already encoded blocks. For example, if for all the blocks with the same intra-prediction mode k which are already encoded in the current frame, transform N×N is the most frequently occurring transform, MPT(k) can be set to be N×N transform for the encoding of the current block. In such an example, the frequency with such transforms occur can be tracked by both video encoder 20 and video decoder 30, such that the mapping of most probable transforms to intra-prediction modes can be dynamically adjusted at both video encoder 20 and video decoder 30 without the mapping being explicitly signaled between video encoder 20 and video decoder 30.

Summer 80 sums the residual blocks with the corresponding prediction blocks generated by motion compensation unit 72 or intra-prediction processing unit 74 to form decoded blocks. If desired, a deblocking filter may also be applied to filter the decoded blocks in order to remove blockiness artifacts. The decoded video blocks are then stored in reference frame store 82, which provides reference blocks for subsequent motion compensation and also produces decoded video for presentation on a display device (such as display device 32 of FIG. 1).

In this manner, video decoder 30 represents an example of a video decoder that can be configured to determine an intra-prediction mode for a block of video data, identify a most probable transform based on the intra-prediction mode determined for the block of video data, and code an indication of whether the most probable transform is a transform used to encode the block of video data. The most probable transform can be a non-square transform. Video decoder 30 can code the indication of whether the most probable transform is the transform used to encode the block of video data comprises receiving a flag indicating whether the most probable transform is the transform used to encode the block of video data. In response to the flag indicating the most probable transform is the transform used to encode the block of the video data, video decoder 30 can reconstruct the block of video data based on the most probable transform. In response to the most probable transform not being the transform used to encode the block of video data, video decoder 30 can receive an indication of a transform other than the most probable transform and reconstruct the block of video data based on the transform other than the most probable transform. The transforms can be selected from a group of transforms consisting of N×N, hN×2N, and 2N×hN, where N represents a size of a dimension of a transform, hN represents half the value of N, and 2N represents twice the value of N.

Video decoder 30 may also maintain a mapping of most probable transforms to intra-prediction modes. The mapping can be fixed, signaled from a video encoder to video decoder 30, or can be adaptive. If the mapping is adaptive, the mapping may, for example, be adaptive based on block size. The mapping can be based on a frequency of how often transforms have been selected for previously encoded video blocks with a particular intra-prediction mode.

Figure 9:
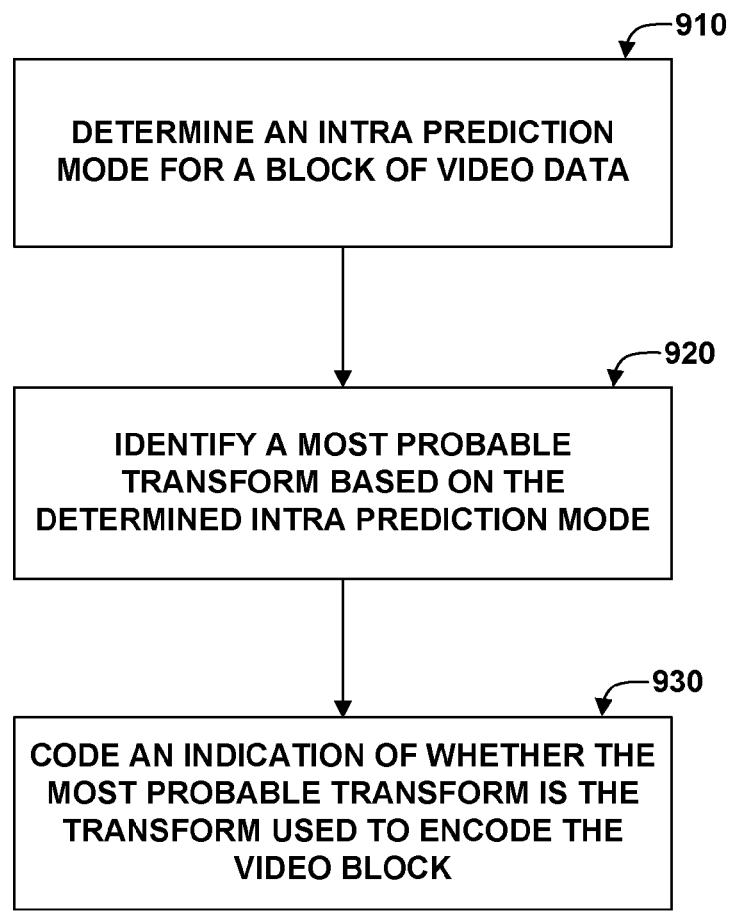
FIG. 9 is a flow chart that illustrates an example method for signaling a transform according to the techniques of this disclosure.

FIG. 9 is a flow chart that illustrates an example method for signaling a transform size according to the techniques of this disclosure. The techniques of FIG. 9 will be described with reference to a generic video coder. The generic video coder may, for example, be a video encoder such as video encoder 20 or a video decoder such as video decoder 30.

The video coder determines an intra-prediction mode for a block of video data (910). The video coder identifies a most probable transform based on the intra-prediction mode determined for the block of video data (920). The most probable transform can be either a square transform or a non-square transform. The video coder codes an indication of whether the most probable transform is a transform used to encode the block of video data (930). The transforms can be selected from a group of transforms consisting of N×N, hN×2N, and 2N×hN, wherein N represents a size of a dimension of a transform, hN represents half the value of N, and 2N represents twice the value of N.

The video coder can maintain a mapping of most probable transforms to intra-prediction modes. The mapping can be fixed or signaled from a video encoder to a video decoder. The mapping can also be adaptive. The mapping may, for example, be adaptive based on block size. The mapping can also be based on a frequency of how often transforms have been selected for previously encoded video blocks with a particular intra-prediction mode.

When the video coder is a video encoder, the video coder can code the indication of whether the most probable transform is the transform used to encode the block of video data by generating a flag indicating whether the most probable transform is the transform used to encode the block of video data. In response to the most probable transform not being the transform used to encode the block of video data, the video coder can generate an indication of a transform other than the most probable transform that is the transform used to encode the block of video data.

When the video coder is a video decoder, the video decoder can code the indication of whether the most probable transform is the transform used to encode the block of video data by receiving a flag indicating whether the most probable transform is the transform used to encode the block of video data. In response to the flag indicating the most probable transform is the transform used to encode the block of the video data, the video coder can reconstruct the block of video data based on the most probable transform. In response to the most probable transform not being the transform used to encode the block of video data, the video coder can receive an indication of a transform other than the most probable transform and reconstruct the block of video data based on the transform other than the most probable transform.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of decoding video data, the method comprising:
   receiving, by a decoding device, a plurality of intra-encoded blocks of video data within a video bitstream, wherein each block of the plurality of intra-encoded blocks is encoded according to one of a plurality of intra-prediction modes and one of a plurality of transforms, wherein the received video bitstream comprises:
     a first indication of a first intra-prediction mode among the plurality of intra-prediction modes used to encode a first block; and
     a second indication that indicates that a most likely transform among a first plurality of transforms included within a first mapping between the first plurality of transforms and the first intra-prediction mode was used to encode the first block;
   determining that the first block was encoded using the first intra-prediction mode based on the first indication;
   maintaining, by the decoding device, the first mapping between the first plurality of transforms and the first intra-prediction mode, the first mapping indicating the most likely transform for the first intra-prediction mode and the first mapping being adaptive based on a block size
   determining, by the decoding device, that the most likely transform was the transform that was used to encode the first block based on the second indication and the first mapping; and
   in response to the determination that the most likely transform was used to encode the first block, reconstructing, by the decoding device, the first block based on the most likely transform.

2. The method of claim 1, wherein the first mapping is based on a frequency of how often transforms have been selected for previously encoded video blocks with the first intra-prediction mode.

3. The method of claim 1, wherein the plurality of transforms is selected from the group consisting of N=N, hN×2N, and 2N×hN, wherein N represents a size of a dimension of a transform, hN represents half the value of N, and 2N represents twice the value of N.

4. The method of claim 1, wherein the method of decoding is performed as part of an encoding process.

5. The method of claim 1, further comprising:
receiving the video data at a receiver of a wireless communication device, wherein receiving the video data at the receiver of the wireless communication device comprises demodulating, according to a wireless communication standard, a signal comprising the video data;
storing the video data in a memory of the wireless communication device; and
processing the video data on one or more processors of the wireless communication device.

6. A video decoding device, the device comprising:
a memory configured to store video data; and
one or more processors implemented in circuitry and configured to:
receive a plurality of intra-encoded blocks of video data within a video bitstream, wherein each block of the plurality of intra-encoded blocks is encoded according to one of a plurality of intra-prediction modes and one of a plurality of transforms, wherein the received video bitstream comprises:
a first indication of a first intra-prediction mode among the plurality of intra-prediction modes used to encode a first block; and
a second indication that indicates that a most likely transform among a first plurality of transforms included within a first mapping between the first plurality of transforms and the first intra-prediction mode was used to encode the first block;
determine that the first block was encoded using the first intra-prediction mode based on the first indication;
maintain the first mapping between the first plurality of transforms and the first intra-prediction mode, the first mapping indicating the most likely transform for the first intra-prediction mode and the first mapping being adaptive based on a block size
determine that the most likely transform was the transform that was used to encode the first block based on the second indication and the first mapping; and
in response to the determination that the most likely transform was used to encode the first block, reconstruct the first block based on the most likely transform.

7. The video coding device of claim 6, wherein the first mapping is based on a frequency of how often transforms have been selected for previously encoded video blocks with the first intra-prediction mode.

8. The video coding device of claim 6, wherein the plurality of transforms is selected from the group consisting of N×N, hN×2N, and 2N×hN, wherein N represents a size of a dimension of a transform, hN represents half the value of N, and 2N represents twice the value of N.

9. The device of claim 6, wherein the device comprises a wireless communication device, further comprising a receiver configured to receive encoded video data.

10. The device of claim 9, wherein the wireless communication device comprises a telephone handset and wherein the receiver is configured to demodulate, according to a wireless communication standard, a signal comprising the encoded video data.

11. A non-transitory computer readable medium storing instructions that when executed by one or more processors implemented in circuitry cause the one or more processors to:
receive, a plurality of intra-encoded blocks of video data within a video bitstream, wherein each block of the plurality of intra-encoded blocks is encoded according to one of a plurality of intra-prediction modes and one of a plurality of transforms, wherein the received video bitstream comprises:
a first indication of a first intra-prediction mode among the plurality of intra-prediction modes used to encode a first block; and
a second indication that indicates that a most likely transform among a first plurality of transforms included within a first mapping between the first plurality of transforms and the first intra-prediction mode was used to encode the first block;
determine that the first block was encoded coded using the first intra-prediction mode based on the first indication;
maintain, the first mapping between the first plurality of transforms and the first intra-prediction mode, the first mapping indicating the most likely transform for the first intra-prediction mode and the first mapping being adaptive based on a block size
determine that the most likely transform was the transform that was used to encode the first block based on the second indication and the first mapping; and
in response to the determination that the most likely transform was used to encode the first block, reconstruct the first block based on the most likely transform.

\* \* \* \* \*